(12) United States Patent
Maruyama

(10) Patent No.: US 9,541,390 B2
(45) Date of Patent: Jan. 10, 2017

(54) SURVEYING CONTROL DEVICE, SURVEYING DEVICE, CONTROL METHOD FOR SURVEYING DEVICE, AND CONTROL PROGRAM THEREFOR

(71) Applicant: NIKON-TRIMBLE CO., LTD., Tokyo (JP)

(72) Inventor: Tomohiro Maruyama, Yokohama (JP)

(73) Assignee: NIKON-TRIMBLE CO., LTD., Tokyo (JP)

( * ) Notice: Subject to any disclaimer, the term of this patent is extended or adjusted under 35 U.S.C. 154(b) by 163 days.

(21) Appl. No.: 14/416,690

(22) PCT Filed: Jul. 26, 2013

(86) PCT No.: PCT/JP2013/070295
§ 371 (c)(1),
(2) Date: Jan. 23, 2015

(87) PCT Pub. No.: WO2014/017622
PCT Pub. Date: Jan. 30, 2014

(65) Prior Publication Data
US 2015/0176991 A1     Jun. 25, 2015

(30) Foreign Application Priority Data

Jul. 26, 2012   (JP) ................................ 2012-165681

(51) Int. Cl.
*G01C 15/02*     (2006.01)
*G01C 15/00*     (2006.01)
(52) U.S. Cl.
CPC .................................. *G01C 15/002* (2013.01)
(58) Field of Classification Search
CPC ............................. G01C 15/02; G01C 15/002
(Continued)

(56) References Cited

U.S. PATENT DOCUMENTS 5,777,899 A * 7/1998 Kumagai ................ G01C 15/00
                                                                   33/291
5,907,907 A * 6/1999 Ohtomo ................ G01C 15/004
                                                                  33/281
(Continued)

FOREIGN PATENT DOCUMENTS

JP      2000-346647 A    12/2000
JP      2006-038683 A     2/2006
(Continued)

OTHER PUBLICATIONS

Nov. 10, 2015 Office Action issued in Japanese Patent Application No. 2012-165681.
(Continued)

*Primary Examiner* — G. Bradley Bennett
(74) *Attorney, Agent, or Firm* — Oliff PLC

(57) ABSTRACT

A surveying device includes: an angle-of-view value acquisition unit which acquires the angle of view of a telescope; and a manipulation amount correction unit which, on the basis of the angle of view acquired by the angle-of-view value acquisition unit, corrects the displacement amount of the telescope such that the displacement amount of the telescope with respect to the rotation amounts of a horizontal tangent screw and a vertical tangent screw when the angle of view of the telescope is a first angle of view is smaller than the displacement amount of the telescope with respect to the rotation amounts of the horizontal tangent screw and the vertical tangent screw when the angle of view of the telescope is a second angle of view wider than the first angle of view.

8 Claims, 9 Drawing Sheets

(58) Field of Classification Search
USPC .......................................... 33/290, 291, 292
See application file for complete search history.

(56) References Cited

U.S. PATENT DOCUMENTS

| | | | | |
|---|---|---|---|---|
| 6,182,372 | B1* | 2/2001 | Lamm | G01C 1/02 33/290 |
| 6,753,951 | B2* | 6/2004 | Fukumoto | G02B 7/32 356/4.01 |
| 7,769,475 | B2 | 8/2010 | Fujimoto et al. | |
| 7,793,424 | B2* | 9/2010 | Laabs | G01C 15/002 33/290 |
| 2006/0158722 | A1 | 7/2006 | Fujimoto et al. | |
| 2008/0069406 | A1 | 3/2008 | Matsuo et al. | |
| 2010/0088910 | A1* | 4/2010 | Svanholm | G01C 15/002 33/290 |
| 2012/0272536 | A1* | 11/2012 | Nishita | G01C 15/06 33/290 |
| 2013/0093882 | A1* | 4/2013 | Kotzur | G01C 1/04 348/135 |
| 2015/0040411 | A1* | 2/2015 | Fujioka | G01C 9/06 33/292 |
| 2015/0185008 | A1* | 7/2015 | Nishita | G01C 15/002 33/293 |
| 2016/0076885 | A1* | 3/2016 | Nishita | G01C 15/008 33/292 |

FOREIGN PATENT DOCUMENTS

| | | |
|---|---|---|
| JP | 2008-076105 A | 4/2008 |
| JP | 2012-027386 A | 2/2012 |
| WO | 2004/107013 A1 | 12/2004 |

OTHER PUBLICATIONS

Aug. 20, 2013 Search Report issued in International Application No. PCT/JP2013/070295.

Jan. 27, 2015 International Report on Patentability issued in International Patent Application No. PCT/JP2013/070295.

* cited by examiner

SURVEYING CONTROL DEVICE, SURVEYING DEVICE, CONTROL METHOD FOR SURVEYING DEVICE, AND CONTROL PROGRAM THEREFOR

TECHNICAL FIELD

The present invention relates to surveying control devices that control a surveying device provided with a telescope having either a wide-angle lens and a telephoto lens or a zoom function, surveying devices provided with a telescope having either a wide-angle lens and a telephoto lens or a zoom function, control methods for such surveying devices, and control programs therefor.

BACKGROUND ART

Japanese Unexamined Patent Application Publication No. 2008-76105A discloses a surveying device in which a telescope block including a digital camera unit and a collimating telescope is mounted on a leveling table that freely rotates central to a horizontal axis and a vertical axis.

As such a device, Japanese Unexamined Patent Application Publication No. 2000-346647A discloses a surveying device in which a telescope unit is mounted on a base plate that freely rotates central to a horizontal axis and a vertical axis. The surveying device of Japanese Unexamined Patent Application Publication No. 2000-346647A includes a tangent screw for rotationally manipulating (manipulating the displacement of) the telescope unit central to the horizontal axis and a tangent screw for rotationally manipulating (manipulating the displacement of) the telescope unit central to the vertical axis.

SUMMARY OF INVENTION

Technical Problem

However, in surveying devices such as those mentioned above, there is always a constant rotation amount (displacement amount) for the telescope according to the manipulation amounts of the respective tangent screws. As such, an amount of movement within a screen of an image formed by the telescope when the telescope is rotated by manipulating the tangent screw (for example, an amount of movement within a monitor of a display image obtained by a digital camera) changes greatly according to a change in magnification of the telescope, and there have been cases where tasks such as collimating (adjusting the directions of the telescope's axes) have been difficult for an operator using the surveying device.

In other words, the angle of view of the image formed by the lens (a value indicating a range in which the image appears as an angle) will differ between a case where a wide-angle lens is used or the magnification of the telescope is low, and a case where a telephoto lens is used, the magnification of the telescope is high, or the like; the angle of view becomes wider in a case where a wide-angle lens is used, the magnification of the telescope is low, or the like; and the angle of view becomes narrower in a case where a telephoto lens is used, the magnification of the telescope is high, or the like.

Accordingly, even if the tangent screw is manipulated by the same manipulation amount, the angle of view is wide in the case where a wide-angle lens is used, the magnification of the telescope is low, or the like, and thus the amount of movement of the image formed by the lens becomes small, whereas the angle of view is narrow in the case where a telephoto lens is used, the magnification of the telescope is high, or the like, and thus the amount of movement of the image formed by the lens becomes great. For example, if, when attempting to rotate (displace) the telescope central to the horizontal axis, the vertical axis, or the like by manipulating the tangent screw in order to move, within the screen, the image formed by the lens with the magnification increased, the tangent screw is manipulated by the same manipulation amount as when the magnification is low, the amount of movement of the image within the screen will become greater than when the magnification is low, and the image may move off-screen.

As such, even if the tangent screw is manipulated by the same manipulation amount, the amount of movement within the screen of the image formed by the lens will change due to changes in the angle of view accompanying changes in the magnification, and thus it has been difficult to manipulate the tangent screw, resulting in cases where it is difficult for the operator of the surveying device to carry out tasks such as collimating (a task for adjusting the directions of the axes of the telescope and the like).

An object of the present invention is to prevent the amount of movement within a screen of an image formed by a telescope when the telescope is rotated by manipulating a tangent screw from greatly changing according to a change in the angle of view accompanying the change in the magnification of the telescope.

Solution to Problem

A first aspect of the present invention provides a surveying control device for controlling a surveying device having a telescope mounted so that an orientation thereof is adjustable relative to a base portion and magnification thereof is variable, a manipulation unit manipulated upon adjusting the orientation of the telescope, a detection unit for detecting a manipulation amount of the manipulation unit, and a displacement control unit for displacing the orientation of the telescope according to a detection value of the detection unit. Such a surveying control device comprises an acquisition unit for acquiring at least one of the magnification of the telescope and an angle of view of an image formed by the telescope; and a correction unit for, based on at least one of the magnification and the angle of view acquired by the acquisition unit, correcting a displacement amount of the telescope so that the displacement amount of the telescope in a case where the angle of view of the telescope is a first angle of view is smaller than the displacement amount of the telescope in a case where the angle of view of the telescope is a second angle of view wider than the first angle of view.

According to a second aspect of the present invention, it is preferable that the correction unit reduce the displacement amount of the telescope as the angle of view narrows.

According to a third aspect of the present invention, it is preferable that the correction unit reduce the displacement amount of the telescope as the magnification increases.

According to a fourth aspect of the present invention, it is preferable that the telescope is switchable between a first optical system having a telephoto lens as an objective lens and a second optical system having a wide-angle lens as an objective lens, and that the acquisition unit acquire at least one of the magnification and the angle of view based on switching information of the first optical system and the second optical system.

According to a fifth aspect of the present invention, it is preferable that the displacement control unit include a motor for changing the orientation of the telescope and a drive control unit for controlling driving of the motor according to a detection value detected by the detection unit, and that the correction unit correct the displacement amount of the telescope by correcting a driving amount of the motor.

A sixth aspect of the present invention provides a surveying device having a telescope mounted so that an orientation thereof is adjustable relative to a base portion and magnification thereof is variable; a manipulation unit manipulated upon adjusting the orientation of the telescope; a detection unit for detecting a manipulation amount of the manipulation unit; a displacement control unit for displacing the orientation of the telescope according to a detection value of the detection unit; an acquisition unit for acquiring at least one of the magnification of the telescope and an angle of view of an image formed by the telescope; and a correction unit for, based on at least one of the magnification and the angle of view acquired by the acquisition unit, correcting the displacement amount of the telescope so that the displacement amount of the telescope in the case where the angle of view of the telescope is a first angle of view is smaller than the displacement amount of the telescope in the case where the angle of view of the telescope is a second angle of view wider than the first angle of view.

A seventh aspect of the present invention provides a control method for a surveying device having a telescope mounted so that an orientation is adjustable relative to a base portion and magnification thereof is variable, a manipulation unit manipulated upon adjusting the orientation of the telescope, a detection unit for detecting a manipulation amount of the manipulation unit, and a displacement control unit for displacing the orientation of the telescope according to a detection value of the detection unit. Such a method comprises the steps of: acquiring, in an acquisition unit, at least one of the magnification of the telescope and an angle of view of an image formed by the telescope; and correcting, based on at least one of the magnification and the angle of view acquired in the acquiring step, the displacement amount of the telescope in a correction unit so that the displacement amount of the telescope in the case where the angle of view of the telescope is a first angle of view is smaller than the displacement amount of the telescope in the case where the angle of view of the telescope is a second angle of view wider than the first angle of view.

An eighth aspect of the present invention provides a computer-readable control program for a surveying device having a telescope mounted so that an orientation thereof is adjustable relative to a base portion and magnification thereof is variable, a manipulation unit manipulated upon adjusting the orientation of the telescope, a detection unit for detecting a manipulation amount of the manipulation unit, and a displacement control unit for displacing the orientation of the telescope according to a detection value of the detection unit. Such a computer-readable program causes a computer to execute: acquiring, in an acquisition unit, at least one of the magnification of the telescope and an angle of view of an image formed by the telescope; and correcting, based on at least one of the magnification and the angle of view acquired in the acquiring step, the displacement amount of the telescope in a correction unit so that the displacement amount of the telescope in the case where the angle of view of the telescope is a first angle of view is smaller than the displacement amount of the telescope in the case where the angle of view of the telescope is a second angle of view wider than the first angle of view.

According to the first, sixth, seventh, and eighth aspects of the present invention, correction is carried out so that, when the angle of view of the telescope is narrowed to the first angle of view, the displacement amount of the telescope is lower than when the angle of view of the telescope is widened to the second angle of view, and thus even when the angle of view of the telescope is narrowed and the manipulation unit is manipulated by the same manipulation amount as when the angle of view of the telescope is wide, the image formed by the telescope will not move greatly within the screen as compared to a case where the displacement amount of the telescope is not corrected. Accordingly, the amount of movement within the screen of the image formed by the telescope when the orientation of the telescope is adjusted by manipulating the manipulation unit can be suppressed from changing greatly according to a change in the angle of view accompanying a change in the magnification of the telescope. Therefore, for example, even if the operator using the surveying device sets the magnification of the telescope to a high magnification (narrows the angle of view), an object to be surveyed that is the image formed by the telescope will no longer move greatly within the screen and will also not move off-screen, and thus the object to be surveyed can be caught quickly.

According to the second aspect of the present invention, the displacement amount of the orientation of the telescope relative to the manipulation amount of the manipulation unit can be controlled through a simple process.

According to the third aspect of the present invention, the displacement amount of the orientation of the telescope relative to the manipulation amount of the manipulation unit can be controlled through a simple process.

According to the fourth aspect of the present invention, the magnification or the angle of view can be acquired using information on switching between the first optical system and the second optical system provided in the telescope.

According to the fifth aspect of the present invention, the displacement amount of the telescope can be corrected through a simple process of correcting the driving amount of the motor that changes the orientation of the telescope.

DESCRIPTION OF EMBODIMENTS

An embodiment of the present invention will be described with reference to the drawings.

A surveying device is given as the present embodiment. The surveying device according to the present embodiment is, for example, a total station (hereinafter, called TS) in which a telescope freely rotates central to two orthogonal axes.

A manual TS (that is, MTS) that is operated manually, a motor-driven TS (that is, an STS) that operates automatically through motor driving, and the like can be given as the TS. Furthermore, as motor-driven TSs, there are automatic collimating TSs that have a function for automatically collimating a target (a reflecting prism, for example) serving as an object to be surveyed present in the field of view of a telescope, automatic tracking TSs that have a function for automatically tracking a moving target or the like. For example, with an automatic tracking TS, a single operator can perform surveying.

The surveying device according to the present embodiment is configured as any of the aforementioned TSs.

Figure 1:
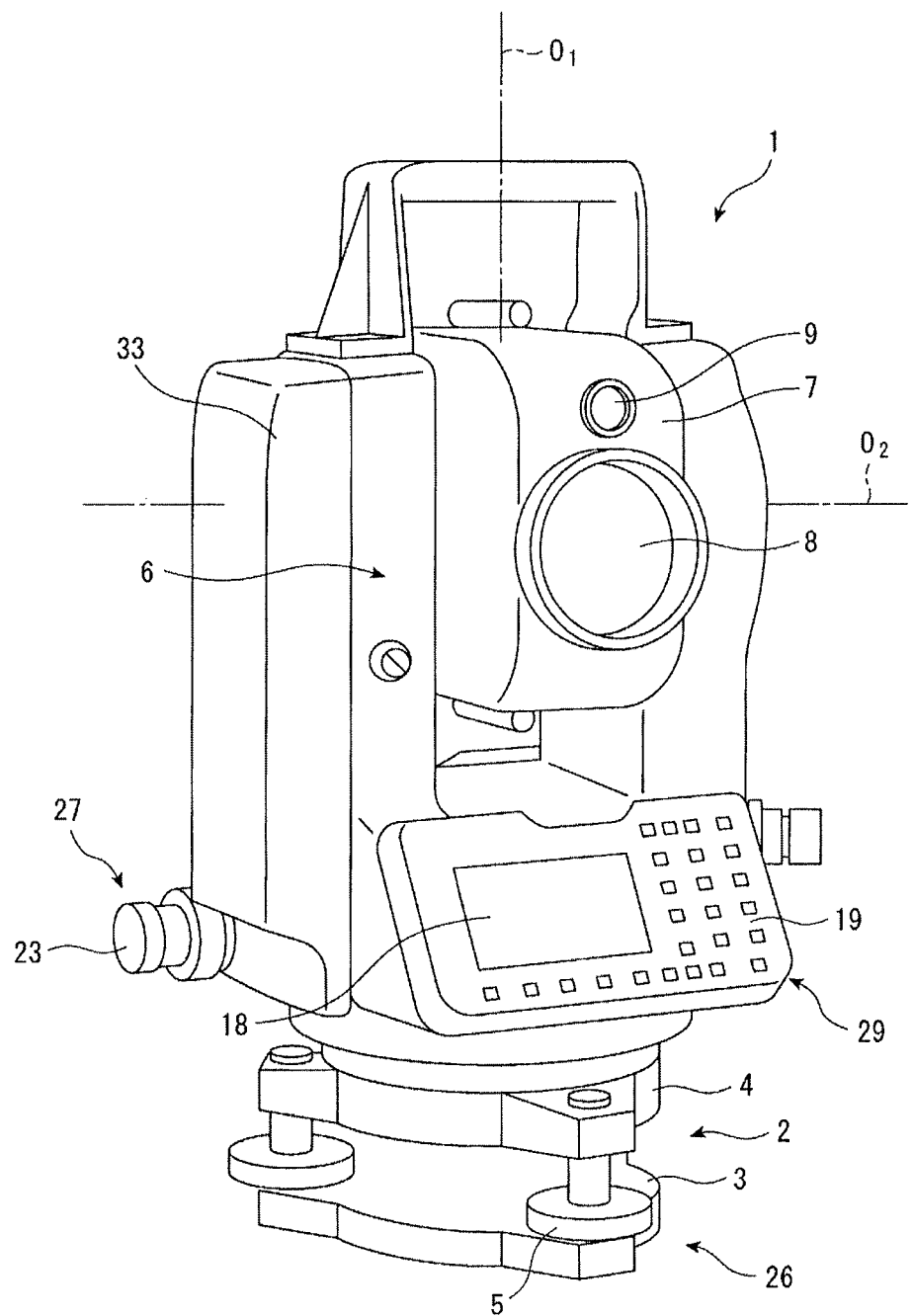
FIG. 1 is a diagram illustrating an example of the exterior constitution of a surveying device according to an embodiment.
Figure 2:
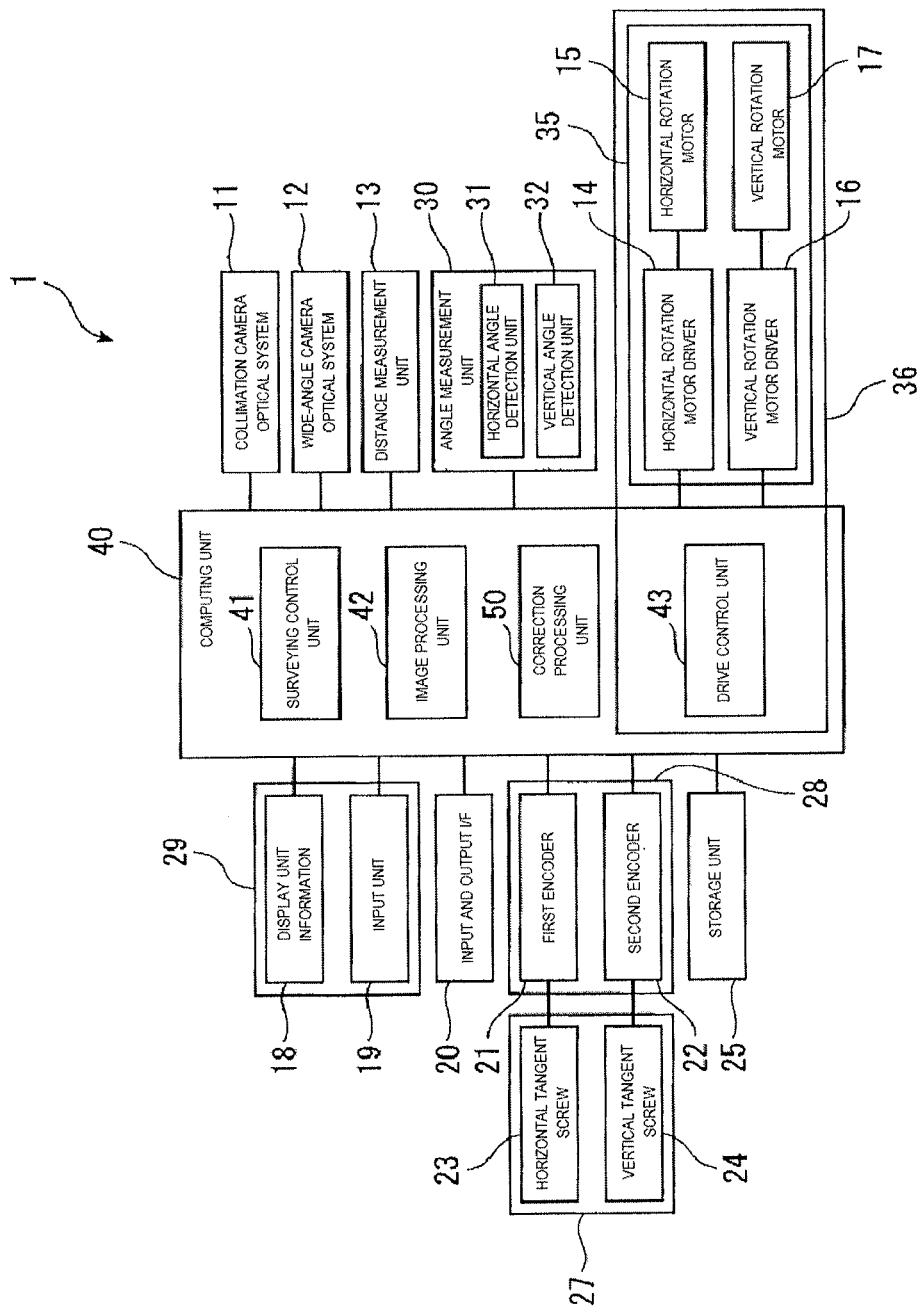
FIG. 2 is a block diagram illustrating an example of the constitution of a surveying device.

Hereinafter, a surveying device 1 will be described in detail using FIGS. 1 to 3.

The surveying device 1 includes: a telescope 7 that is mounted so that an orientation thereof is adjustable relative to a base portion 26 and magnification thereof (for example, a first magnification and a second magnification that is lower than the first magnification) is variable; a manipulation unit 27 manipulated when adjusting the orientation of the telescope 7; a detection unit 28 that detects a manipulation amount of the manipulation unit 27; a displacement control unit 36 that displaces the orientation of the telescope 7 according to a detection value of the detection unit 28; an angle-of-view value acquisition unit 51 that acquires the angle of view of an image formed by the telescope 7; and a manipulation amount correction unit 52 that, based on the angle of view acquired by the angle-of-view value acquisition unit 51, corrects the displacement amount of the telescope 7 so that the displacement amount of the telescope in the case where the angle of view of the telescope 7 is a first angle of view (or in the case where the magnification of the telescope 7 is the first magnification) is smaller than the displacement amount of the telescope 7 in the case where the angle of view of the telescope 7 is a second angle of view that is wider than the first angle of view (or in the case where the magnification of the telescope 7 is the second magnification).

The surveying device 1 also includes a leveling device 2 anchored on a tripod (not illustrated), a device main body 6 mounted on the tripod via the leveling device 2, and a computing unit 40 that controls the device main body 6 and carries out various types of computations.

Here, the leveling device 2 has a base (or base plate) 3 attached to the top of the tripod, an attachment part 4 to which the surveying device 1 is attached, and a leveling screw 5 that is disposed between the base 3 and the attachment part 4 and adjusts a degree of tilt of the attachment part 4 relative to the base 3. Here, the base 3, the attachment part 4, and the like constitute the base portion 26. For example, prior to starting a surveying task, an operator adjusts the leveling screw 5 of the leveling device 2 so that a bubble in a bubble tube serving as a tilt detection part provided in, for example, the attachment part 4 is located at a predetermined position.

The device main body 6 has an approximately U-shaped support main body 33 that freely rotates relative to the attachment part 4 of the leveling device 2 central to a first axis $O_1$ that is a vertical axis, and the telescope 7 that freely rotates relative to the support main body 33 central to a second axis $O_2$ that is a horizontal axis. Here, a telephoto lens 8 for collimation (hereinafter, called a collimating lens) and a wide-angle lens 9 are provided in the telescope 7 as objective lenses. The wide-angle lens 9 is provided above the collimating lens 8. Meanwhile, the collimating lens 8 constitutes a part of a collimation camera optical system (or a telephoto camera optical system) 11, described later, and the wide-angle lens 9 constitutes a part of a wide-angle camera optical system 12, also described later.

The collimation camera optical system 11 includes the collimating lens 8 and a collimating CCD (Charge Coupled Device) (not illustrated). The collimation camera optical system 11 outputs, to the computing unit 40, a capture image captured by the collimating CCD via the collimating lens 8.

The wide-angle camera optical system 12 includes the wide-angle lens 9 and a wide-angle CCD (not illustrated). The wide-angle camera optical system 12 outputs, to the computing unit 40, a capture image captured by the wide-angle CCD via the wide-angle lens 9.

Meanwhile, the fine movement manipulation unit 27, serving as a manipulation unit for finely rotating the support main body 33 and the telescope 7 central to the first axis $O_1$ and the second axis $O_2$, respectively, is provided in the device main body 6.

The fine movement manipulation unit 27 includes a horizontal tangent screw 23 for rotating the telescope 7 central to the first axis $O_1$ (this rotation direction will be called horizontal direction rotation hereinafter) and a vertical tangent screw 24 for rotating the telescope 7 central to the second axis $O_2$ (this rotation direction will be called vertical direction rotation or up-down direction rotation hereinafter). The operator can change the orientation of the telescope 7 in the horizontal direction, the vertical direction, or the like by rotationally manipulating the horizontal tangent screw 23, the vertical tangent screw 24, or the like.

A display and input unit 29 is provided on a front surface side of the device main body 6. The display and input unit 29 includes a display unit 18 that displays an image formed by the telescope 7, computational results, and the like, and an information input unit 19 for inputting information for surveying. The display and input unit 29 is electrically connected to the computing unit 40.

The display unit 18 displays various types of information as text, diagrams, and the like. The display unit 18 is a liquid crystal display or the like, for example. A display state of the display unit 18 is controlled by the computing unit 40.

The information input unit 19 is a part through which information is inputted by being manipulated by a user. For example, the information input unit 19 is constituted by a push-button switch such as a numerical keypad or the like. In addition, capturing an image using the collimation camera optical system 11 or the wide-angle camera optical system 12 is selectable using the information input unit 19 (a camera selection key, for example). Furthermore, a zoom magnification employed when capturing an image using the collimation camera optical system 11 can be set using the information input unit 19 (a zoom magnification setting key, for example). The information input unit 19 outputs various types of inputted information to the computing unit 40.

The manipulation amount detection unit 28 is provided within the device main body 6 as a detection unit. The manipulation amount detection unit 28 includes a first encoder 21 that detects the manipulation amount of the horizontal tangent screw 23 and a second encoder 22 that detects the manipulation amount of the vertical tangent screw 24.

Meanwhile, a distance measurement unit 13, and an angle measurement unit 30 constituted by a horizontal angle detection unit 31 and a vertical angle detection unit 32 are provided within the device main body 6.

The distance measurement unit 13 includes the telescope 7 as part of its constitution, and measures a distance to an object to be surveyed such as a target. The distance measurement unit 13 outputs a measured value to the computing unit 40.

Typical distance measurement techniques include a technique with a prism that uses a reflective body such as a reflecting prism as a target, a technique without a prism that does not use a reflecting prism, and the like. In the technique with a prism, for example, the distance is measured based on a time difference between when the reflecting prism is irradiated with a laser beam and when light reflected by the prism is received. An example of a target with a reflecting prism or the like is a pole with a mirror. Meanwhile, the technique without a prism does not use a reflecting prism, and thus there is no need to provide a reflecting prism, and as such the degree of freedom of the surveying is higher than with the technique with a prism.

In other words, with the technique without a prism, surveying is possible from a remote location without having to set foot in the surveying site. The distance measurement unit 13 is configured so as to employ any of these distance measurement techniques, for example.

The angle measurement unit 30 includes the horizontal angle detection unit 31 and the vertical angle detection unit 32. The horizontal angle detection unit 31 detects a rotation angle of the main body 6 that rotates in the horizontal direction, or in other words, of the telescope 7 (that is, a horizontal angle). The vertical angle detection unit 32 detects a rotation angle of the telescope 7 that rotates in the vertical direction (that is, a vertical angle or elevation angle). The horizontal angle detection unit 31 and the vertical angle detection unit 32 output the respective detection values to the computing unit 40. For example, the horizontal angle detection unit 31 is a horizontal angle encoder, and the vertical angle detection unit 32 is a vertical angle encoder.

Meanwhile, a driving device 35 that drives the rotation of the support main body 33 and telescope 7 is provided within the device main body 6. The driving device 35 includes: a horizontal rotation motor 15 that drives the rotation of the telescope 7 relative to the support main body 33 central to the second axis $O_2$; a vertical rotation motor 17 that drives the rotation of the support main body 33 central to the first axis $O_1$; and a horizontal rotation motor driver 14 and a vertical rotation motor driver 16 that drive the horizontal rotation motor 15 and the vertical rotation motor 17 to operate.

The horizontal rotation motor 15 rotates the telescope 7 in the horizontal direction according to the rotation amount of the horizontal tangent screw 23. At this time, the first encoder 21 detects the rotation amount of the horizontal tangent screw 23. The first encoder 21 then outputs the detection value to the computing unit 40. The computing unit 40 outputs, to the horizontal rotation motor driver 14, a horizontal direction rotation command value according to the detection value from the first encoder 21. The horizontal rotation motor driver 14 drives the horizontal rotation motor 15 according to the horizontal direction rotation command value.

The vertical rotation motor 17 rotates the telescope 7 in the vertical direction according to the rotation amount of the vertical tangent screw 24. At this time, the second encoder 22 detects the rotation amount of the vertical tangent screw 24. The second encoder 22 then outputs the detection value to the computing unit 40. The computing unit 40 outputs, to the vertical rotation motor driver 16, a vertical direction rotation command value according to the detection value from the second encoder 22. The vertical rotation motor driver 16 drives the vertical rotation motor 17 according to the vertical direction rotation command value.

Here, the horizontal rotation motor driver 14 and the vertical rotation motor driver 16 are electrically connected to the computing unit 40, which controls the driving thereof.

The aforementioned display and input unit 29, detection unit 28, collimation camera optical system 11, wide-angle camera optical system 12, distance measurement unit 13, angle measurement unit 30, and driving unit 35 are electrically connected to the computing unit 40, and an input and output I/F (interface) 20 and a storage unit 25 are electrically connected to the computing unit 40 as well.

The input and output I/F 20 is an interface for data communication with an external device. Here, a personal computer, a data collector (an electronic notebook), or the like can be given as the external device.

The storage unit 25 is constituted by a ROM, a RAM, a hard disk driver (HDD), or the like. Various types of programs and fixed data, data acquired by the computing unit 40 through processing, and the like are stored in the storage unit 25. Design coordinate data created through CAD or the like, for example, is stored in the storage unit 25.

The computing unit 40 carries out various types of processing for the surveying device 1. For example, the computing unit 40 includes a microcomputer and peripheral circuits thereof. As illustrated in FIG. 2, the computing unit 40 includes a surveying control unit 41, an image processing unit 42, a drive control unit 43, and a correction processing unit 50.

Here, the surveying control unit 41 controls the distance measurement unit 13 and the angle measurement unit 30. In addition, the surveying control unit 41 calculates surveying values based on the detection values of the distance measurement unit 13 and the angle measurement unit 30. The surveying control unit 41 then displays the calculated surveying values on the display unit 18. Here, the surveying control unit 41 can calculate coordinate values of a collimated point (that is, a target) based on a distance, an elevation angle, and a horizontal angle, which serve as the surveying values.

The image processing unit 42 carries out a pre-set image process on the image captured by the collimation camera optical system 11, the image captured by the wide-angle camera optical system 12, and the like. Specifically, the image processing unit 42 carries out a digital zoom process as one of image processes. In this case, the image processing unit 42 carries out the digital zoom process on the image captured by the collimation camera optical system 11 based on the zoom magnification value inputted from the information input unit 19. The image processing unit 42 then displays an image on the display unit 18 based on image data obtained by performing the image process on the capture image.

The drive control unit 43 calculates the horizontal direction rotation command value, the vertical direction rotation command value, and the like according to the detection values of the rotation amounts of the horizontal tangent screw 23 and the vertical tangent screw 24 from the manipulation amount correction unit 52. The drive control unit 43 then outputs the calculated horizontal direction rotation command value to the horizontal rotation motor driver 14, outputs the calculated vertical direction rotation command value to the vertical rotation motor driver 16, and the like. The drive control unit 43, along with the horizontal rotation motor driver 14, the vertical rotation motor driver 16, the horizontal rotation motor 15, and the vertical rotation motor 17, constitutes the displacement control unit 36.

The correction processing unit 50 carries out a process for correcting the rotation amount of the telescope 7 relative to the rotation amounts of the horizontal tangent screw 23, the vertical tangent screw 24, and the like (that is, the displacement amount of the orientation of the telescope 7) according to an angle of view.

Figure 3:
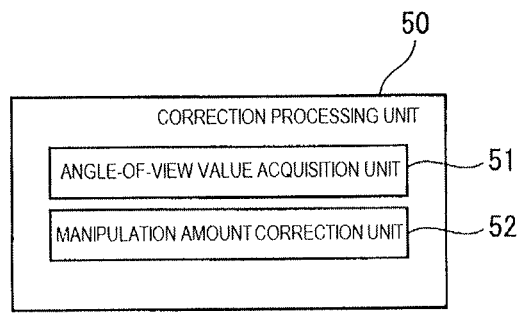
FIG. 3 is a block diagram illustrating an example of the constitution of a correction processing unit.

FIG. 3 is a block diagram illustrating an example of the constitution of the correction processing unit 50.

As illustrated in FIG. 3, the correction processing unit 50 includes the angle-of-view value acquisition unit 51 and the manipulation amount correction unit 52.

The angle-of-view value acquisition unit 51 acquires information or a signal value of an angle of view of an image displayed on the display unit 18 (hereinafter, called an angle-of-view value). Specifically, the angle-of-view value acquisition unit 51 acquires the angle-of-view value based on the image-capturing camera selection information indicating which of the collimation camera optical system 11 and the wide-angle camera optical system 12 an image is captured by, zoom magnification information or a signal value when an image is captured by the collimation camera optical system 11 (hereinafter, called a magnification value), or the like. In other words, for example, in the case where the image-capturing camera selection information indicates that an image is being captured by the collimation camera optical system 11, the angle-of-view value acquisition unit 51 acquires an angle-of-view value that is lower (that is, narrower) than in the case where an image is being captured by the wide-angle camera optical system 12. The angle-of-view value acquisition unit 51 acquires a lower angle-of-view value as the zoom magnification value increases while an image is being captured by the collimation camera optical system 11.

Figure 4:
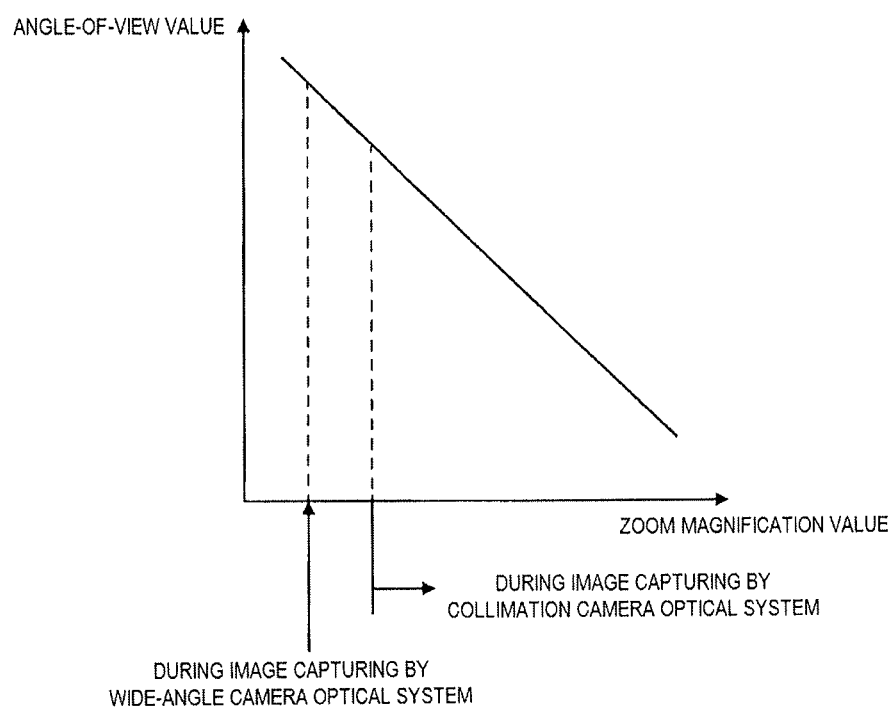
FIG. 4 is a diagram illustrating an example of an angle-of-view value map that associates image-capturing camera selection information, zoom magnification values, or the like with angle-of-view values.

FIG. 4 illustrates an example of an angle-of-view value map for acquiring the angle-of-view value based on the image-capturing camera selection information, the zoom magnification value, or the like.

As illustrated in FIG. 4, in the angle-of-view value map, the angle-of-view value is lower (narrower) during image capturing by the collimation camera optical system 11 than during image capturing by the wide-angle camera optical system 12. In addition, in the angle-of-view value map, the angle-of-view value decreases (narrows) as the zoom magnification increases. The angle-of-view value map is stored in the storage unit 25, for example. The angle-of-view value acquisition unit 51 acquires an angle-of-view value corresponding to image-capturing camera selection information, a zoom magnification value, or the like by referring to the angle-of-view value map such as that illustrated in FIG. 4.

The angle-of-view value acquisition unit 51 then outputs the acquired angle-of-view value to the manipulation amount correction unit 52.

The manipulation amount correction unit 52 corrects the rotation amounts of the horizontal tangent screw 23, the vertical tangent screw 24, and the like, or in other words, the detection values of rotation amounts of the first and second encoders 21 and 22, according to the angle-of-view value acquired by the angle-of-view value acquisition unit 51. Specifically, the manipulation amount correction unit 52 carries out correction that reduces detection values of rotation amounts of the first and second encoders 21 and 22 as the angle-of-view value decreases. For example, the manipulation amount correction unit 52 corrects the detection values of rotation amount of the first and second encoders 21 and 22 by multiplying the detection values of rotation amounts of the first and second encoders 21 and 22 by a correction coefficient that changes according to the angle-of-view value.

Figure 5:
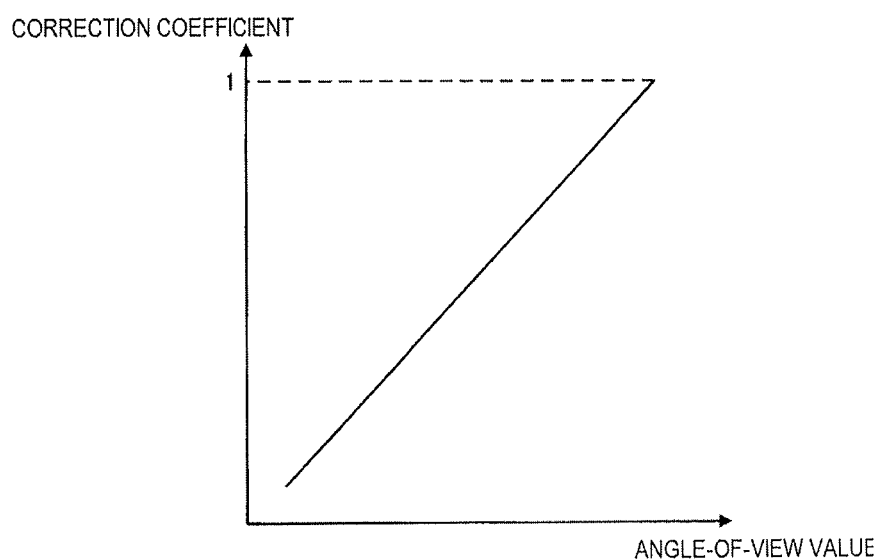
FIG. 5 is a diagram illustrating an example of a correction coefficient map that associates angle-of-view values with correction coefficients.

FIG. 5 is a diagram illustrating an example of a correction coefficient map that associates angle-of-view values with correction coefficients.

As illustrated in FIG. 5, in the correction coefficient map, the correction coefficient increases proportionally with an increase (widening) in the angle-of-view value. The correction coefficient map is stored in the storage unit 25, for example. The manipulation amount correction unit 52 acquires the correction coefficient corresponding to an angle-of-view value by referring to the correction coefficient map such as that illustrated in FIG. 5. Accordingly, the manipulation amount correction unit 52 corrects the detection values of rotation amounts of the first and second encoders 21 and 22 by multiplying the detection values of rotation amounts of the first and second encoders 21 and 22 by the acquired correction coefficient. The manipulation amount correction unit 52 then outputs the corrected detection values of rotation amounts to the drive control unit 43.

The drive control unit 43 calculates the horizontal direction rotation command value, the vertical direction rotation command value, and the like according to the corrected detection values of rotation amounts, and outputs the command values to the horizontal rotation motor driver 14 and the vertical rotation motor driver 16.

Figure 6:
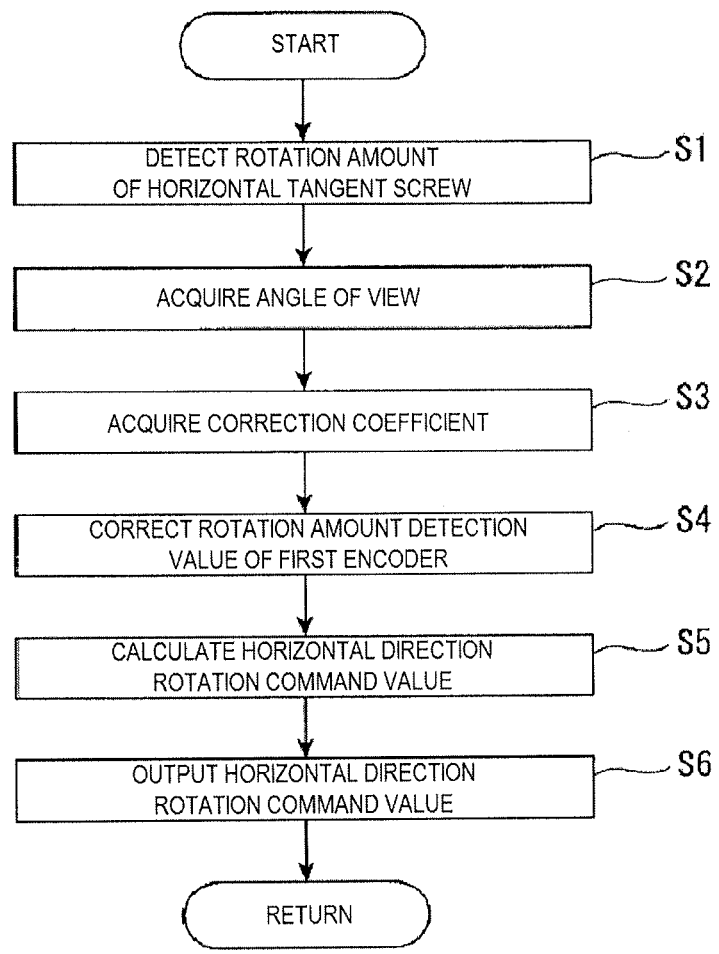
FIG. 6 is a flowchart illustrating an example of a series of processes from when a rotation amount of a horizontal tangent screw is detected to when a horizontal direction rotation command value is outputted.

Next, a series of processes from the detection of the rotation amounts of the horizontal tangent screw 23, the vertical tangent screw 24, and the like to the output of the horizontal direction rotation command value, the vertical direction rotation command value, and the like will be described. FIG. 6 illustrates an example of a series of processes from when the rotation amount of the horizontal tangent screw 23 is detected to when the horizontal direction rotation command value is outputted, and FIG. 7 illustrates an example of a series of processes from when the rotation amount of the vertical tangent screw 24 is detected to when the vertical direction rotation command value is outputted.

As illustrated in FIG. 6, first, in step S1, the correction processing unit 50 detects the rotation amount of the horizontal tangent screw 23. In other words, the correction processing unit 50 acquires the detection value of rotation amount from the first encoder 21. Then, in step S2, the angle-of-view value acquisition unit 51 of the correction processing unit 50 acquires the angle-of-view value corresponding to the image-capturing camera selection information, the zoom magnification value, or the like from the angle-of-view value map or the like. Next, in step S3, the manipulation amount correction unit 52 of the correction processing unit 50 acquires the correction coefficient corresponding to the angle-of-view value acquired in step S2 from the correction coefficient map or the like. Next, in step S4, the manipulation amount correction unit 52 corrects the detection value of rotation amount by multiplying the detection value of rotation amount acquired in step S1 by the correction coefficient acquired in step S3. Then, in step S5, the drive control unit 43 calculates the horizontal direction rotation command value according to the detection value of rotation amount corrected in step S4, and in the following step S6, outputs the calculated horizontal direction rotation command value to the horizontal rotation motor driver 14.

Figure 7:
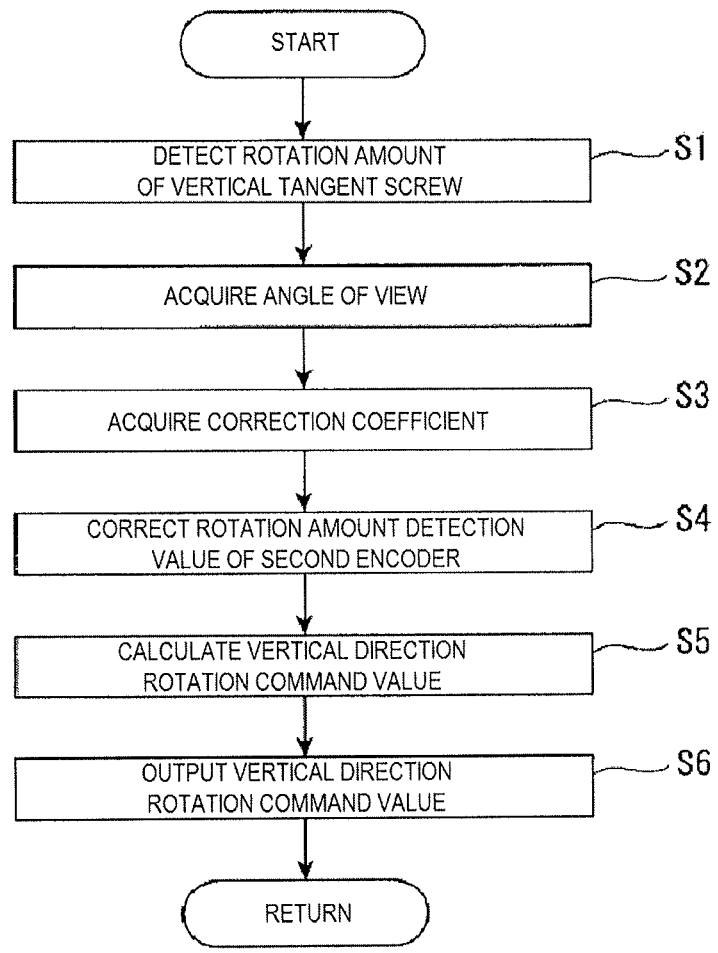
FIG. 7 is a flowchart illustrating an example of a series of processes from when a rotation amount of a vertical tangent screw is detected to when a vertical direction rotation command value is outputted.

Meanwhile, as illustrated in FIG. 7, first, in step S11, the correction processing unit 50 detects the rotation amount of the vertical tangent screw 24. In other words, the correction processing unit 50 acquires the detection value of rotation amount from the second encoder 22. Then, in step S12, the angle-of-view value acquisition unit 51 of the correction processing unit 50 acquires the angle-of-view value corresponding to the image-capturing camera selection information, the zoom magnification value, or the like from the angle-of-view value map or the like. Next, in step S13, the manipulation amount correction unit 52 of the correction processing unit 50 acquires the correction coefficient corresponding to the angle-of-view value acquired in step S12 from the correction coefficient map or the like. Next, in step S14, the manipulation amount correction unit 52 corrects the detection value of rotation amount by multiplying the detection value of rotation amount detected in step S11 by the correction coefficient acquired in step S13. Then, in step S15, the drive control unit 43 calculates the vertical direction rotation command value according to the detection value of rotation amount corrected in step S14, and in the following step S16, outputs the calculated vertical direction rotation command value to the vertical rotation motor driver 16.

Actions, Effects, Etc.

Next, an example of actions, effects, and the like of the surveying device 1 during a surveying task will be described.

The surveying device 1 displays, on the display unit 18, a capture image from a collimation camera or a wide-angle camera based on the image-capturing camera selection information inputted by the operator through the information input unit 19. At this time, if the operator has selected capturing an image using the collimation camera, the surveying device 1 sets the zoom magnification of the collimation camera based on a zoom magnification value inputted through the information input unit 19. In addition, when the horizontal tangent screw 23, the vertical tangent screw 24, or the like is rotationally manipulated by the operator, the surveying device 1 rotates the telescope 7 in the horizontal direction, the vertical direction, or the like according to the rotational manipulation.

For example, in the case where the operator has captured an image using the collimation camera after capturing an image using the wide-angle camera, or in other words, in the case where the magnification has changed from the second magnification employed by the wide-angle camera to the first magnification employed by the collimation camera, the surveying device 1 operates as follows.

When the image-capturing camera selection information for selecting the wide-angle camera is inputted through the information input unit 19, the surveying device 1 displays an image captured by the wide-angle camera (that is, at the second angle of view or the second magnification) on the display unit 18. Then, when the operator rotationally manipulates the horizontal tangent screw 23, the vertical tangent screw 24, or the like so that the target to be measured moves near the center of a reticle line within the screen of the display unit 18, the surveying device 1 rotates the telescope 7 in the horizontal direction, the vertical direction, or the like according to the rotational manipulation.

Thereafter, when the image-capturing camera selection information for selecting the collimation camera is inputted through the information input unit 19, the surveying device 1 displays the image captured by the collimation camera on the display unit 18. At this time, the surveying device 1 displays the capture image on the display unit 18 at a zoom magnification according to the zoom magnification value inputted through the information input unit 19 (that is, at the first angle of view or the first magnification). Then, when the operator rotationally manipulates the horizontal tangent screw 23, the vertical tangent screw 24, or the like so that the target matches the center of the reticle line within the screen of the display unit 18, the surveying device 1 rotates the telescope 7 in the horizontal direction, the vertical direction, or the like according to the rotational manipulation.

During such operations, the surveying device 1 corrects the detection value of rotation amount of the horizontal tangent screw 23 according to the angle of view at which an image is currently being captured, and rotates the telescope 7 (or the main body 6) in the horizontal direction by a horizontal angle according to the corrected detection value. In addition, the surveying device 1 corrects the detection value of rotation amount of the vertical tangent screw 24 according to the angle of view at which an image is currently being captured, and rotates the telescope 7 in the vertical direction by a vertical angle according to the corrected detection value.

Figure 8:
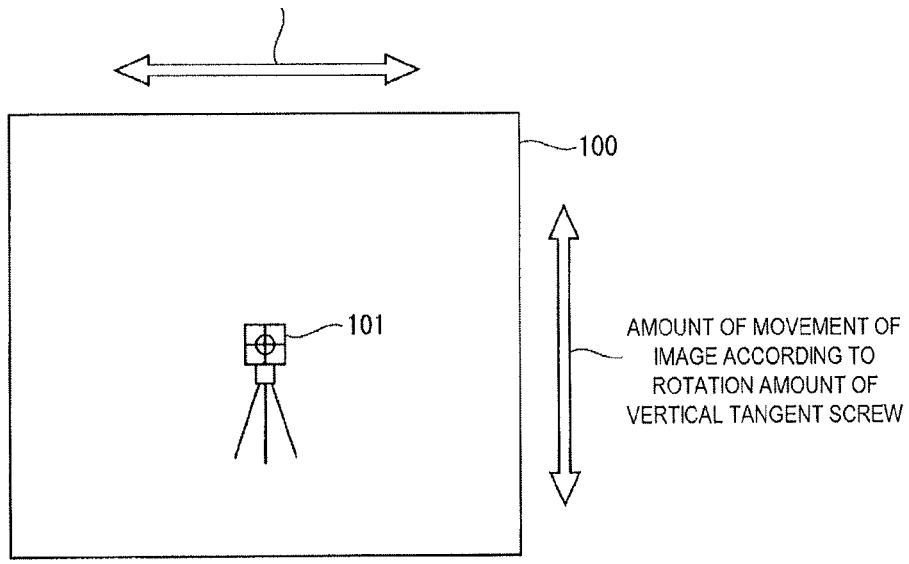
FIG. 8 is a diagram illustrating a relationship between movement of a display image on a display unit and an angle of view according to a rotation amount of a horizontal tangent screw, a vertical tangent screw, or the like, and is a diagram illustrating a case where the angle of view is great.

Here, a relationship between movement of the display image on the display unit 18 and the angle of view, according to the rotation amount of the horizontal tangent screw 23, the vertical tangent screw 24, or the like will be described using FIGS. 8 and 9. FIG. 8 illustrates a case where the angle of view is wide (that is, a case of the second angle of view), and illustrates, for example, a case where an image is being captured by the wide-angle camera or a case where an image is being captured by the collimation camera at a low zoom magnification. Meanwhile, FIG. 9 illustrates a case where the angle of view is narrow (that is, a case of the first angle of view), and illustrates, for example, a case where an image is being captured by the collimation camera, particularly a case where an image is being captured at a high zoom magnification.

Figure 9:
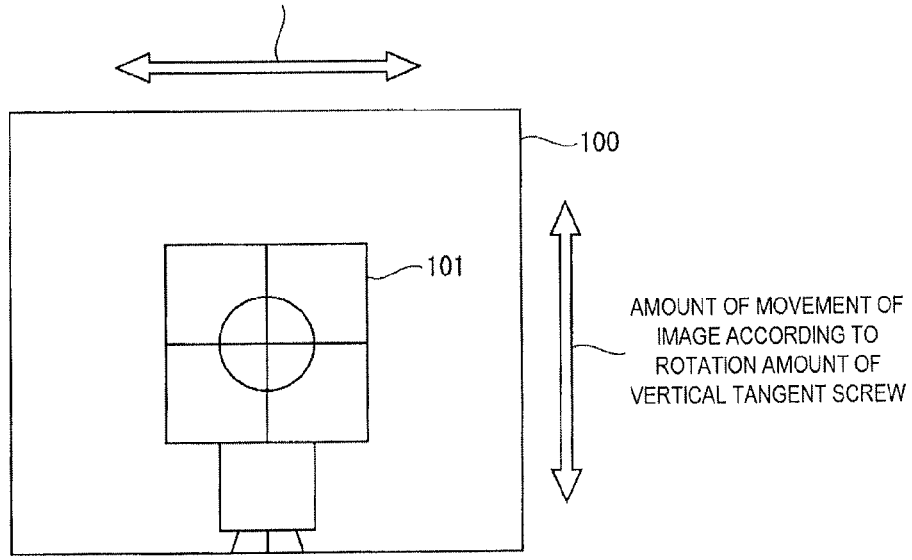
FIG. 9 is a diagram illustrating a relationship between movement of a display image on a display unit and an angle of view according to a rotation amount of a horizontal tangent screw, a vertical tangent screw, or the like and is a diagram illustrating a case where the angle of view is small.

As illustrated in FIG. 8 and FIG. 9, the amount of movement of a display image 100 on the display unit 18 (that is, the amount of movement of a display image 100 such as a target 101 that serves as an object) when the horizontal tangent screw 23, the vertical tangent screw 24, or the like is rotationally manipulated to change the orientation of the telescope 7 consistently has the same value relative to the rotational manipulation amount of the horizontal tangent screw 23, the vertical tangent screw 24, or the like even when the magnification is changed and then the angle of view is made different.

Accordingly, in the surveying device 1, even if the angle of view of the telescope 7 is narrowed and the horizontal tangent screw 23, the vertical tangent screw 24, or the like is manipulated by the same manipulation amount as when the angle of view of the telescope 7 is wide, the image formed by the telescope 7 will not move greatly within the screen, as compared to a case where the displacement amount of the telescope 7 is not corrected. Thus, the surveying device 1 can suppress the amount of movement within the screen of an image formed by telescope 7 when the telescope 7 is rotated by manipulating the horizontal tangent screw 23, the vertical tangent screw 24, or the like from greatly changing according to the change in the angle of view accompanying the change in the magnification of the telescope 7. Therefore, for example, even if the operator using the surveying device 1 sets the magnification of the telescope 7 to a high magnification (even if the angle of view is narrowed), an object to be surveyed that is the image formed by the telescope 7 will no longer move greatly within the screen and will also not move off-screen, and thus the object to be surveyed can be caught quickly.

Variations on Embodiment, Etc

In the aforementioned embodiment, the displacement amount of the orientation of the telescope 7 relative to the rotational manipulation amount of the horizontal tangent screw 23, the vertical tangent screw 24, or the like is controlled so that the amount of movement of the image on the display unit 18 does not differ when the orientation of the telescope 7 is changed even if the angle of view of the telescope 7 differs (that is, so that the amount of movement of the image on the display unit 18 is consistently the same regardless of the angle of view of the telescope 7).

On the contrary, according to a variation on the present embodiment, the displacement amount of the orientation of the telescope 7 relative to the rotational manipulation amount of the horizontal tangent screw 23, the vertical tangent screw 24, or the like can also be controlled so that when the angle of view of the telescope 7 is assumed to be different, the amount of movement of the image on the display unit 18 when the orientation of the telescope 7 is changed does not change greatly (while not being required to be exactly the same).

In other words, according to this variation on the present embodiment, the displacement amount of the orientation of the telescope 7 may be controlled so that the amount of movement of the image on the display unit 18 in the case where the angle of view of the telescope 7 is narrow becomes lower than the amount of movement of the image on the display unit 18 in the case where the angle of view of the telescope 7 is wide.

Meanwhile, according to the aforementioned embodiment, the correction coefficient is acquired from the image-capturing camera selection information, the zoom magnification value, or the like using the angle-of-view value map, the correction coefficient map, or the like. However, the embodiment is not limited thereto. In this case, for example, the computing unit 40 acquires the correction coefficient from the image-capturing camera selection information, the zoom magnification value, or the like using a pre-set arithmetic expression.

In addition, according to the aforementioned embodiment, the rotation amount of the telescope 7 relative to the rotation amount of the horizontal tangent screw 23, the vertical tangent screw 24, or the like is corrected based on the angle-of-view value. However, the embodiment is not limited thereto. In this case, for example, the rotation amount of the telescope 7 relative to the rotation amount of the horizontal tangent screw 23, the vertical tangent screw 24, or the like is corrected based on the zoom magnification value. For example, the computing unit 40 calculates the correction coefficient for correcting the detection values of rotation amounts of the first and second encoders 21 and 22 based on the zoom magnification value.

Figure 10:
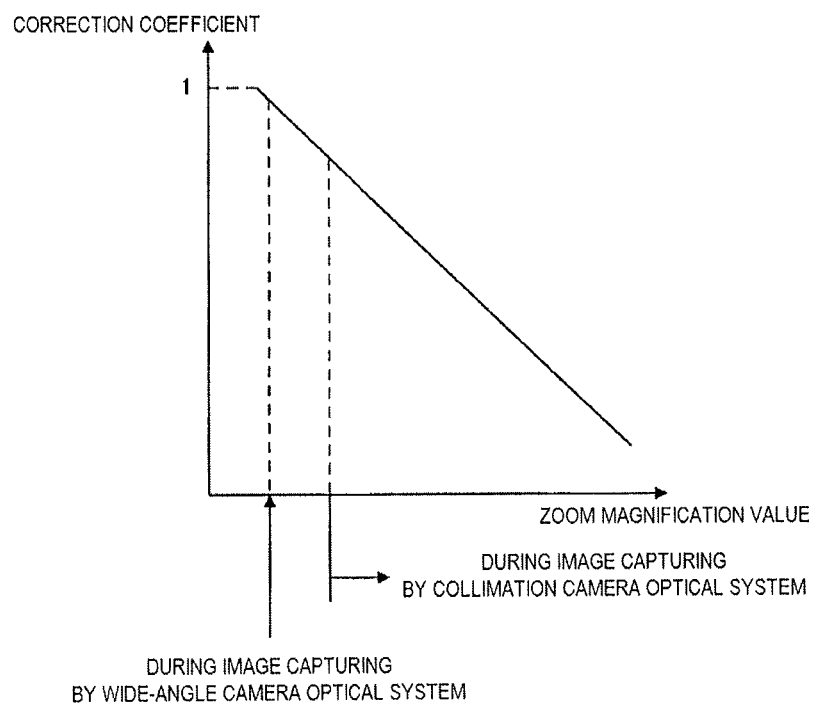
FIG. 10 is a diagram illustrating an example of a correction coefficient map that associates zoom magnification values with correction coefficients.

Here, FIG. 10 illustrates an example of a correction coefficient map that associates zoom magnification values with correction coefficients.

As illustrated in FIG. 10, in the correction coefficient map, the correction coefficient decreases as the zoom magnification value increases. The computing unit 40 acquires the correction coefficient corresponding to a zoom magnification value by referring to the correction coefficient map such as that illustrated in FIG. 10. Accordingly, the computing unit 40 corrects the detection values of rotation amounts of the first and second encoders 21 and 22 by multiplying the detection values of rotation amounts of the first and second encoders 21 and 22 by the acquired correction coefficient.

In addition, according to a variation on the present embodiment, the rotation amount of the telescope 7 relative to the rotation amount of the horizontal tangent screw 23, the vertical tangent screw 24, or the like can be corrected based on the angle-of-view value, the zoom magnification value, or the like, without employing a correction coefficient. In this case, for example, the computing unit 40 calculates correction values for the detection values of rotation amounts of the first and second encoders 21 and 22 based on the angle-of-view value, the zoom magnification value, or the like, using a pre-set arithmetic expression.

In addition, according to the aforementioned embodiment, the rotation amount of the telescope 7 relative to the rotation amount of the horizontal tangent screw 23, the vertical tangent screw 24, or the like is corrected according to the angle of view by correcting the rotation amount of the horizontal tangent screw 23, the vertical tangent screw 24, or the like (that is, the detection value of rotation amount of each of the encoders 21 and 22) based on the angle-of-view value. However, the embodiment is not limited thereto. In other words, for example, according to a variation on the present embodiment, correcting the rotation amount of the telescope 7 relative to the rotation amount of the horizontal tangent screw 23, the vertical tangent screw 24, or the like according to the angle of view can also be realized by correcting the horizontal direction rotation command value, the vertical direction rotation command value, or the like based on the angle-of-view value. In addition, according to a variation on the present embodiment, correcting the rotation amount of the telescope 7 relative to the rotation amount of the horizontal tangent screw 23, the vertical tangent screw 24, or the like according to the angle of view can also be realized by correcting a gain of the horizontal rotation motor driver 14, the vertical rotation motor driver 16, or the like based on the angle-of-view value.

In addition, according to a variation on the present embodiment, the rotation amount of the telescope 7 relative to the rotation amount of the horizontal tangent screw 23, the vertical tangent screw 24, or the like can also be corrected using both the angle-of-view value and the zoom magnification value.

In addition, according to a variation on the present embodiment, the telescope can also include only the collimation camera optical system 11, and not include the wide-angle camera optical system 12.

In addition, according to a variation on the present embodiment, the present invention can also be applied in a case where the display unit 18 is not included, or in other words, in a case where sighting tasks are carried out using an eyepiece (not illustrated) in the telescope 7. Even in this case, for example, the computing unit 40 acquires the angle-of-view value based on information on the objective lens, of the collimating lens 8 and the wide-angle lens 9, that is being used by the operator in a task, the zoom magnification value in the case where the collimating lens 8 is being used in the task, or the like.

In addition, according to a variation on the present embodiment, the display unit (a touch panel, for example) 18, the information input unit 19, or the like can be provided with the functions of the horizontal tangent screw 23, the vertical tangent screw 24, and the like. In this case, the computing unit 40 corrects information on manipulation amounts of the telescope 7 in the horizontal direction, the vertical direction, and the like inputted through the display unit (a touch panel, for example) 18, the information input unit 19, or the like based on the angle-of-view value.

In addition, although the surveying device 1 is provided with a digital zoom, according to a variation on the present embodiment, an optical zoom can also be provided. In this case, the computing unit 40 acquires the angle-of-view value based on a zoom magnification value of the optical zoom.

In addition, according to a variation on the present embodiment, the present invention can be applied in a theodolite in addition to a total station.

Meanwhile, according to the aforementioned embodiment, the computing unit 40 realizes a surveying control device. In other words, the computing unit 40 controls the surveying device 1 having the telescope 7 mounted so that the orientation thereof is adjustable relative to the base portion 26 and magnification thereof is variable, the manipulation unit 27 manipulated when adjusting the orientation of the telescope 7, the detection unit 28 that detects the manipulation amount of the manipulation unit 27, and the displacement control unit 36 that displaces the orientation of the telescope 7 according to a detection value of the detection unit 28. The computing unit 40 includes: the angle-of-view value acquisition unit 51 that acquires at least one of the magnification of the telescope 7 and the angle of view of the image formed by the telescope 7; and the manipulation amount correction unit 52 that, based on at least one of the magnification and the angle of view acquired by the angle-of-view value acquisition unit 51, corrects the displacement amount of the telescope 7 so that the displacement amount of the telescope 7 in the case where the angle of view of the telescope 7 is the first angle of view is smaller than the displacement amount of the telescope 7 in the case where the angle of view of the telescope 7 is the second angle of view wider than the first angle of view.

Meanwhile, according to the aforementioned embodiment, a control method for the surveying device 1 is realized. That is, in a control method for a surveying device having the telescope 7 mounted so that the orientation thereof is adjustable relative to the base portion 26 and magnification thereof is variable, the manipulation unit 27 manipulated when adjusting the orientation of the telescope 7, the detection unit 28 that detects the manipulation amount of the manipulation unit 27, and the displacement control unit 36 that displaces the orientation of the telescope 7 according to a detection value of the detection unit 28. The method comprises the steps of: acquiring at least one of the magnification of the telescope 7 and the angle of view of the image formed by the telescope 7 (step 2, step 12) in the angle-of-view value acquisition unit 51; and correcting, based on at least one of the magnification and the angle of view acquired in the acquiring step, the displacement amount of the telescope 7 in the manipulation amount correction unit 52 so that the displacement amount of the telescope 7 in the case where the angle of view of the telescope 7 is the first angle of view is smaller than the displacement amount of the telescope 7 in the case where the angle of view of the telescope 7 is the second angle of view wider than the first angle of view (step 4, step 14).

In addition, according to the aforementioned embodiment, the aforementioned processes carried out by the surveying device 1 includes processes realized by the computing unit 40 executing a program stored in the storage unit 25. In this case, it is possible that the program is stored in the storage unit 25 from when the surveying device 1 is originally shipped, but it is also possible that the program is loaded from a storage medium removable relative to the surveying device 1 so as to be stored in the storage unit 25 by work performed by the operator or the like.

Although an embodiment of the present invention has been described in detail, the scope of the present invention is not intended to be limited to the exemplary embodiment illustrated in the drawings and described herein, and is intended to include all embodiments providing equivalent effects to those that are the object of the present invention. Furthermore, the scope of the present invention is not intended to be limited to the combination of features of the invention as defined in claim 1, and can be defined by all desired combinations of specific features from among all of the respective features disclosed herein.

The invention claimed is:

1. A surveying control device for controlling a surveying device having a telescope mounted so that an orientation thereof is adjustable relative to a base portion and magnification thereof is variable, a manipulation unit manipulated upon adjusting the orientation of the telescope, a detection unit for detecting a manipulation amount of the manipulation unit, and a displacement control unit for displacing the orientation of the telescope according to a detection value of the detection unit, the surveying control device comprising:
   an acquisition unit for acquiring at least one of the magnification of the telescope and an angle of view of an image formed by the telescope; and
   a correction unit for, based on at least one of the magnification and the angle of view acquired by the acquisition unit, correcting a displacement amount of the telescope so that the displacement amount of the telescope in a case where the angle of view of the telescope is a first angle of view is smaller than the displacement amount of the telescope in a case where the angle of view of the telescope is a second angle of view wider than the first angle of view.

2. The surveying control device according to claim 1, wherein the correction unit reduces the displacement amount of the telescope as the angle of view narrows.

3. The surveying control device according to claim 1, wherein the correction unit reduces the displacement amount of the telescope as the magnification increases.

4. The surveying control device according to claim 1, wherein the telescope is switchable between a first optical system having a telephoto lens as an objective lens and a second optical system having a wide-angle lens as an objective lens; and
   wherein the acquisition unit acquires at least one of the magnification and the angle of view based on switching information of the first optical system and the second optical system.

5. The surveying control device according to claim 1, wherein the displacement control unit includes a motor for changing an orientation of the telescope and a drive control unit for controlling driving of the motor according to a detection value detected by the detection unit; and the correction unit corrects the displacement amount of the telescope by correcting a driving amount of the motor.

6. A surveying device comprising:
 a telescope mounted so that an orientation thereof is adjustable relative to a base portion and magnification thereof is variable;
 a manipulation unit manipulated upon adjusting the orientation of the telescope;
 a detection unit for detecting a manipulation amount of the manipulation unit;
 a displacement control unit for displacing the orientation of the telescope according to a detection value of the detection unit;
 an acquisition unit for acquiring at least one of the magnification of the telescope and an angle of view of an image formed by the telescope; and
 a correction unit for, based on at least one of the magnification and the angle of view acquired by the acquisition unit, correcting a displacement amount of the telescope so that the displacement amount of the telescope in a case where the angle of view of the telescope is a first angle of view is smaller than the displacement amount of the telescope in a case where the angle of view of the telescope is a second angle of view wider than the first angle of view.

7. A control method for a surveying device having a telescope mounted so that an orientation thereof is adjustable relative to a base portion and magnification thereof is variable, a manipulation unit manipulated upon adjusting the orientation of the telescope, a detection unit for detecting a manipulation amount of the manipulation unit, and a displacement control unit for displacing the orientation of the telescope according to a detection value of the detection unit, the method comprising the steps of:
 acquiring, in an acquisition unit, at least one of the magnification of the telescope and an angle of view of an image formed by the telescope; and
 correcting, based on at least one of the magnification and the angle of view acquired in the acquiring step, a displacement amount of the telescope in a correction unit so that the displacement amount of the telescope in a case where the angle of view of the telescope is a first angle of view is smaller than the displacement amount of the telescope in a case where the angle of view of the telescope is a second angle of view wider than the first angle of view.

8. A tangible computer-readable storage medium storing a program for controlling a surveying device having a telescope mounted so that an orientation thereof is adjustable relative to a base portion and magnification thereof is variable, a manipulation unit manipulated upon adjusting the orientation of the telescope, a detection unit for detecting a manipulation amount of the manipulation unit, and a displacement control unit for displacing the orientation of the telescope according to a detection value of the detection unit, the program causing a computer to execute:
 acquiring, in an acquisition unit, at least one of the magnification of the telescope and an angle of view of an image formed by the telescope; and
 correcting, based on at least one of the magnification and the angle of view acquired in the acquiring step, a displacement amount of the telescope in a correction unit so that the displacement amount of the telescope in a case where the angle of view of the telescope is a first angle of view is smaller than the displacement amount of the telescope in a case where the angle of view of the telescope is a second angle of view wider than the first angle of view.

* * * * *